United States Patent
Chen

(10) Patent No.: US 9,433,865 B2
(45) Date of Patent: Sep. 6, 2016

(54) GAME SYSTEM, GAME CONTROL METHOD, AND INFORMATION STORAGE MEDIUM FOR DISTRIBUTING A GAME PICTURE PLAYED BY A GIVEN USER TO ANOTHER USER FOR GAME PLAY

(71) Applicant: KONAMI DIGITAL ENTERTAINMENT CO., LTD., Minato-ku, Tokyo (JP)

(72) Inventor: Yenchao Chen, Setagaya-ku (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 69 days.

(21) Appl. No.: 13/960,947

(22) Filed: Aug. 7, 2013

(65) Prior Publication Data
US 2014/0045591 A1    Feb. 13, 2014

(30) Foreign Application Priority Data
Aug. 9, 2012   (JP) .................... 2012-177318

(51) Int. Cl.
| | |
|---|---|
| A63F 9/24 | (2006.01) |
| A63F 13/493 | (2014.01) |
| A63F 13/40 | (2014.01) |
| A63F 13/30 | (2014.01) |
| A63F 13/79 | (2014.01) |
| A63F 13/812 | (2014.01) |

(52) U.S. Cl.
CPC ............ *A63F 13/493* (2014.09); *A63F 13/10* (2013.01); *A63F 13/12* (2013.01); *A63F 13/79* (2014.09); *A63F 13/812* (2014.09); *A63F 2300/634* (2013.01); *A63F 2300/8011* (2013.01)

(58) Field of Classification Search
None
See application file for complete search history.

(56) References Cited

U.S. PATENT DOCUMENTS

| | | | |
|---|---|---|---|
| 2009/0131177 A1* | 5/2009 | Pearce | 463/43 |
| 2009/0253507 A1 | 10/2009 | Ishii et al. | |
| 2010/0069159 A1 | 3/2010 | Yamada et al. | |
| 2011/0201414 A1* | 8/2011 | Barclay et al. | 463/25 |
| 2011/0312424 A1* | 12/2011 | Burckart et al. | 463/42 |
| 2011/0319160 A1* | 12/2011 | Arn et al. | 463/30 |
| 2013/0172086 A1* | 7/2013 | Ikenaga | 463/43 |

FOREIGN PATENT DOCUMENTS

| | | | |
|---|---|---|---|
| JP | 2009-247564 A | 10/2009 | |
| JP | 2010-63840 A | 3/2010 | |
| WO | WO/2012/039211 | * 3/2012 | ............. A63F 13/10 |

OTHER PUBLICATIONS

Communication dated Jan. 26, 2016 from the Japanese Patent Office issued in corresponding Application No. 2012-177318.

* cited by examiner

*Primary Examiner* — Jason Yen
(74) *Attorney, Agent, or Firm* — Sughrue Mion, PLLC

(57) ABSTRACT

A recording unit of a game system records a picture of a game that has been played by a user and a situation of the game at a given timing of the picture in a storage unit in association with each other. A display control unit displays the picture on a display unit corresponding to another user. A providing unit for provides the another user with the game starting from the given timing based on the situation of the game associated with the picture.

15 Claims, 10 Drawing Sheets

FIG.6

| PICTURE ID | SITUATION |
|---|---|
| 001 | GAME SITUATION DATA A |
| 002 | GAME SITUATION DATA B |
| ⋮ | ⋮ |

FIG.7

| PICTURE ID | USER ID | PICTURE DATA |
|---|---|---|
| 001 | A | PICTURE DATA 001 |
| 002 | C | PICTURE DATA 002 |
| ⋮ | ⋮ | ⋮ |

FIG.11

| OPERATION TIMING | OPERATION DESCRIPTION |
|---|---|
| t1 | A BUTTON |
| t2 | B BUTTON |
| ⋮ | ⋮ |

GAME SYSTEM, GAME CONTROL METHOD, AND INFORMATION STORAGE MEDIUM FOR DISTRIBUTING A GAME PICTURE PLAYED BY A GIVEN USER TO ANOTHER USER FOR GAME PLAY

CROSS-REFERENCE TO RELATED APPLICATION

The present application claims priority from Japanese application JP 2012-177318 filed on Aug. 9, 2012, the content of which is hereby incorporated by reference into this application.

BACKGROUND OF THE INVENTION

1. Field of the Invention

The present invention relates to a game system, a game control method, and an information storage medium.

2. Description of the Related Art

Up to now, there is known a technology for presenting a picture of a game played by a given user to another user. For example, Japanese Patent Application Laid-open No. 2009-247564 discloses a technology for distributing a picture of a game played by a given user to computers of other users.

SUMMARY OF THE INVENTION

However, in the technology disclosed in Japanese Patent Application Laid-open No. 2009-247564, for example, even if a user who has viewed a distributed picture of a game shows interest in a situation of the game indicated by the picture, the situation cannot be played by the user himself/herself.

The present invention has been made in view of the above-mentioned problem, and an object thereof is to provide a game system, a game control method, and an information storage medium, which enable another user to play a game based on a situation indicated by a picture of the game played by a given user.

In order to solve the above-mentioned problem, according to an exemplary embodiment of the present invention, there is provided a game system (S) for controlling a game played by a user. The game system (S) includes: recording means (108) for recording a picture of the game that has been played by the user and a situation of the game at a given timing of the picture in storage means (100) in association with each other; means (114) for displaying the picture on display means (36) corresponding to another user; and providing means (116) for providing the another user with the game starting from the given timing based on the situation of the game associated with the picture.

According to an exemplary embodiment of the present invention, there is provided a game device (1) for controlling a game played by a user. The game device (1) includes: means (102) for acquiring storage content of storage means for storing a picture of the game that has been played by the user and a situation of the game at a given timing of the picture in association with each other; and providing means (116) for providing another user with the game starting from the given timing based on the situation of the game associated with the picture displayed on display means (36) corresponding to the another user.

According to an exemplary embodiment of the present invention, there is provided a game control method for a game played by a user. The game control method includes: acquiring (102) storage content of a storage (100) for storing a picture of the game that has been played by the user and a situation of the game at a given timing of the picture in association with each other; and providing (116) another user with the game starting from the given timing based on the situation of the game associated with the picture displayed on a display (36) corresponding to the another user.

According to an exemplary embodiment of the present invention, there is provided a program for causing a computer to function as: means (102) for acquiring storage content of storage means (100) for storing a picture of a game that has been played by a user and a situation of the game at a given timing of the picture in association with each other; and providing means (116) for providing another user with the game starting from the given timing based on the situation of the game associated with the picture displayed on display means (36) corresponding to the another user.

Further, according to an exemplary embodiment of the present invention, there is provided a non-transitory computer-readable information storage medium having the above-mentioned program recorded thereon.

According to the exemplary embodiment of the present invention, the another user is enabled to play the game based on the situation indicated by the picture of the game played by the given user.

Further, according to the exemplary embodiment of the present invention, the game system (S) further includes: user situation determining means (104) for determining whether or not the situation of the game played by the user is a given situation; and means (106) for determining, based on a determination result from the user situation determining means (104), whether or not recording processing is to be executed by the recording means (108).

Further, according to the exemplary embodiment of the present invention, the game system (S) further includes: another user situation determining means (120) for determining, in a case where the another user plays the game provided by the providing means (116), whether or not the situation of the game is a given situation; and end determination means (122) for determining whether or not to bring the game provided by the providing means (116) to an end based on a determination result from the another user situation determining means (120).

Further, according to the exemplary embodiment of the present invention, the another user situation determining means (120) determines, in the case where the another user plays the game provided by the providing means (116), whether or not an elapsed time since the game is started reaches a reference time, and the end determination means (122) determines that the game provided by the providing means (116) is to be brought to an end in a case where it is determined that the elapsed time has reached the reference time.

Further, according to the exemplary embodiment of the present invention, the game system (S) further includes: means (124) for recording a description of an operation of the user corresponding to the picture in the storage means (100); and means (126) for displaying, in a case where the another user plays the game provided by the providing means (116), the description of the operation of the user corresponding to the picture in the display means (36) corresponding to the another user.

Further, according to the exemplary embodiment of the present invention, the game system (S) further includes: means (124) for recording a description of an operation of the user corresponding to the picture in the storage means (100); and means (128) for evaluating, in a case where the another user plays the game provided by the providing means (116), a gameplay of the another user based on a comparison result between the description of the operation of the user corresponding to the picture and a description of an operation of the another user.

Further, according to the exemplary embodiment of the present invention, the providing means (116) makes a preparation to start the game to be provided to the another user during a period in which the picture is being played back on the display means (36) corresponding to the another user.

Note that, reference numerals and symbols illustrated in the figures that are parenthesized are described above for an easy understanding of the present invention, by which the game device or the like according to the exemplary embodiment of the present invention is not limited to an exemplary embodiment illustrated in the figures.

BRIEF DESCRIPTION OF THE DRAWINGS

In the accompanying drawings:

FIG. 6 is a data storage example of picture-situation association data;

FIG. 7 is a figure illustrating storage content of a highlight picture storage unit;

FIG. 11 is a data storage example of operation description data.

DETAILED DESCRIPTION OF THE INVENTION

1. Hardware Structure of Game System

Figure 1:
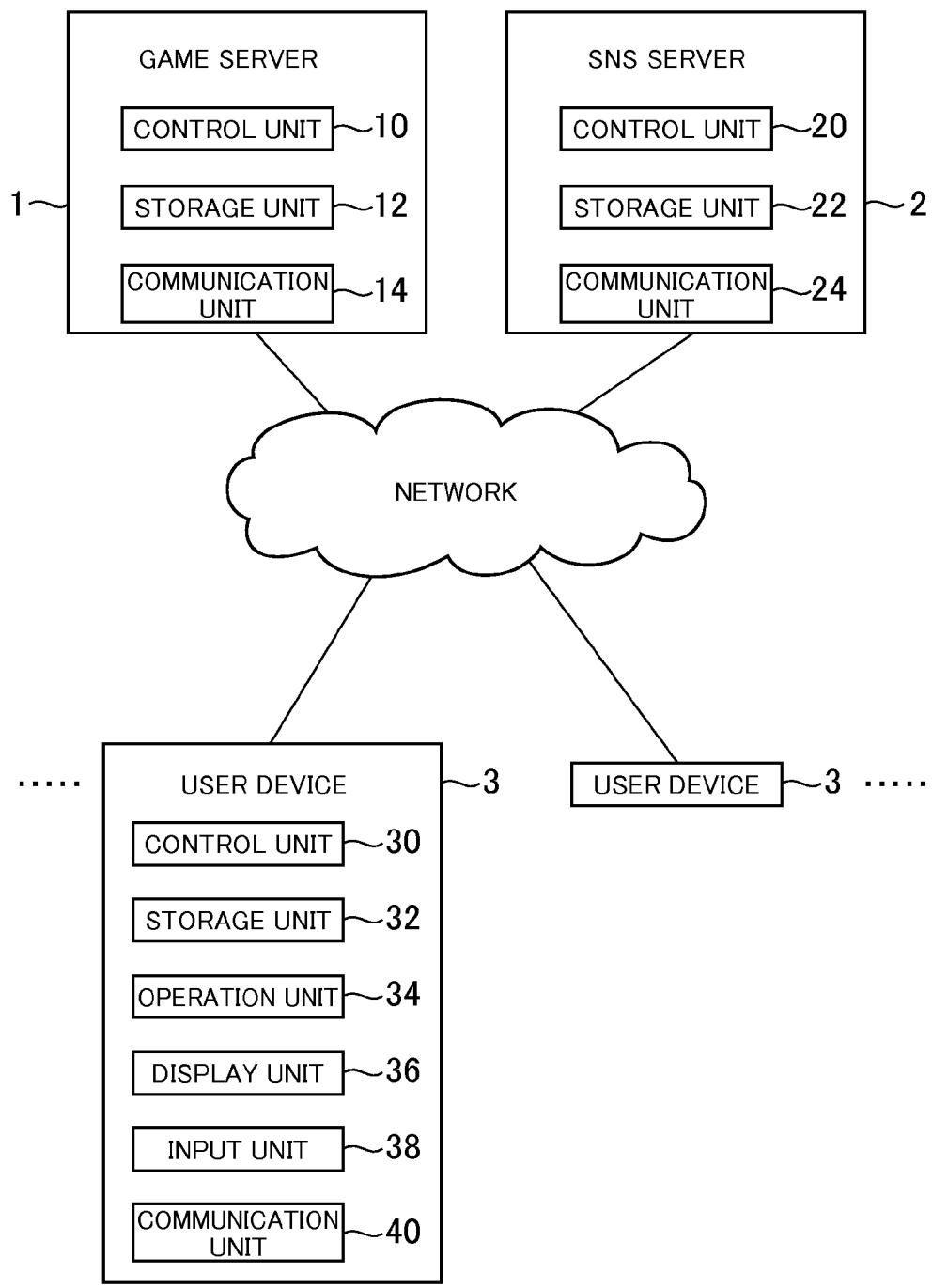
FIG. 1 is a diagram illustrating an overall configuration of a game system according to an embodiment of the present invention.

Now, an embodiment of the present invention is described in detail with reference to the accompanying drawings. FIG. 1 is a diagram illustrating an overall configuration of a game system according to the embodiment of the present invention. As illustrated in FIG. 1, a game system S includes, for example, a game server 1 (game device), a social networking service (SNS) server 2, and a plurality of user devices 3. The respective devices included in the game system S are connected to one another via a network so as to be able to perform data communications.

The game server 1 is, for example, a known server computer. The game server 1 controls a game played by a user. As illustrated in FIG. 1, the game server 1 includes a control unit 10, a storage unit 12, and a communication unit 14. Note that, in addition, the game server 1 may include a keyboard (not shown), a monitor (not shown), and a reading device (not shown) for an information storage medium.

The control unit 10 includes, for example, a CPU. The control unit 10 executes programs stored in the storage unit 12 to perform various kinds of processing, and transmits/receives various kinds of data to/from the user device 3 via the communication unit 14. The storage unit 12 includes, for example, a hard disk drive or a memory such as a RAM. The storage unit 12 stores various programs including a game program, various kinds of data, and the like. The communication unit 14 is, for example, a communication device such as a network card.

The SNS server 2 is, for example, a known server computer. The SNS server 2 executes various kinds of processing that allow a plurality of users to communicate to/from one another. A control unit 20, a storage unit 22, and a communication unit 24 are the same hardware structures as the control unit 10, the storage unit 12, and the communication unit 14, respectively, and hence descriptions thereof are omitted. Note that, the storage unit 22 stores various kinds of information (including user IDs, personal information on the users, and details of the users' statements) necessary for the respective users to communicate to/from one another in SNS services.

The user device 3 is implemented by, a known computer. Examples of the user device 3 include a consumer game machine, an arcade game machine, a mobile phone (smartphone), and a personal computer. As illustrated in FIG. 1, the user device 3 includes a control unit 30, a storage unit 32, an operation unit 34, a display unit 36, an input unit 38, and a communication unit 40. Note that, the user device 3 may include other components (not shown).

The control unit 30, the storage unit 32, and the communication unit 40 are the same hardware structures as the control unit 10, the storage unit 12, and the communication unit 14, respectively, and hence descriptions thereof are omitted. The operation unit 34 includes a controller and a keyboard, and transmits a description of the user's operation to the control unit 10. The display unit 36 includes a liquid crystal display panel, and displays various screens in accordance with an instruction issued by the control unit 10. The input unit 38 includes a DVD reproducer, and receives inputs of various kinds of data from an external storage device.

2. Game Executed in Game System

The game system S executes a in which characters perform actions (behaviors) in a game space. This embodiment is described by taking a case of executing a soccer game in which a plurality of characters perform actions in the game space representing a stadium for a soccer match. When the soccer game is started, for example, the game space is constructed in the storage unit 12.

Figure 2:
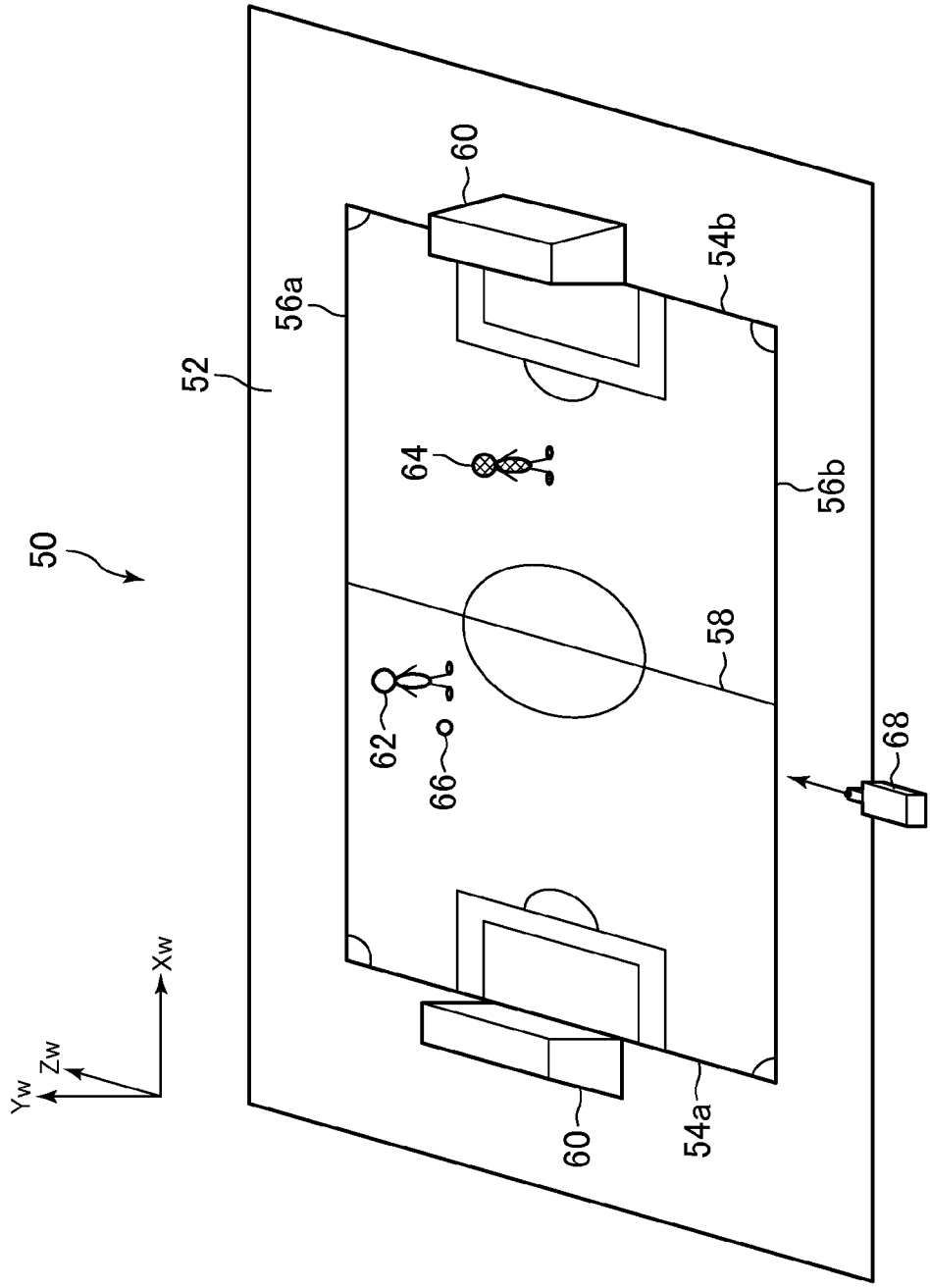
FIG. 2 is a figure illustrating an example of a game space.

FIG. 2 is a figure illustrating an example of the game space. A game space 50 is a virtual three-dimensional space in which three coordinate axes (Xw-axis, Yw-axis, and Zw-axis) that are orthogonal to one another are set. A position of each object placed in the game space 50 is identified by, for example, three-dimensional coordinates of a world coordinate system (Xw-Yw-Zw coordinate system).

As illustrated in FIG. 2, a field 52 being an object representing a soccer field is placed in the game space 50. On the field 52, a soccer match is played between a team operated by the user (hereinafter referred to as "user team") and a team operated by an opponent (computer or another user) (hereinafter referred to as "opponent team").

The field 52 has two goal lines 54a and 54b, two touchlines 56a and 56b, and a center line 58. Placed on the field 52 are goals 60 being objects representing soccer goals, a character 62 being an object representing a soccer player belonging to the user team, a character 64 being an object representing a soccer player belonging to the opponent team, and a ball 66 being an object representing a soccer ball (moving object).

Note that, on the field 52, there are arranged eleven characters 62 belonging to the user team and eleven characters 63 belonging to the opponent team, which are not shown in FIG. 2.

When the character 62 (64) and the ball 66 move towards and approach each other, those character 62 (64) and ball 66 are associated with each other under predetermined conditions. In this case, a moving action of the character 62 (64) is a dribble action. In the following, the state in which the character 62 (64) is associated with the ball 66 is described as "the character 62 (64) in possession of the ball 66."

Further, a virtual camera 68 (point of view) is set up in the game space 50. The display unit 36 displays a game screen expressing how the game space 50 is viewed from the virtual camera 68. The game screen is generated by coordinate-converting vertex coordinates of the respective objects arranged in the game space 50 from the world coordinate system into a screen coordinate system by using a predetermined coordinate conversion operation.

Figure 3:
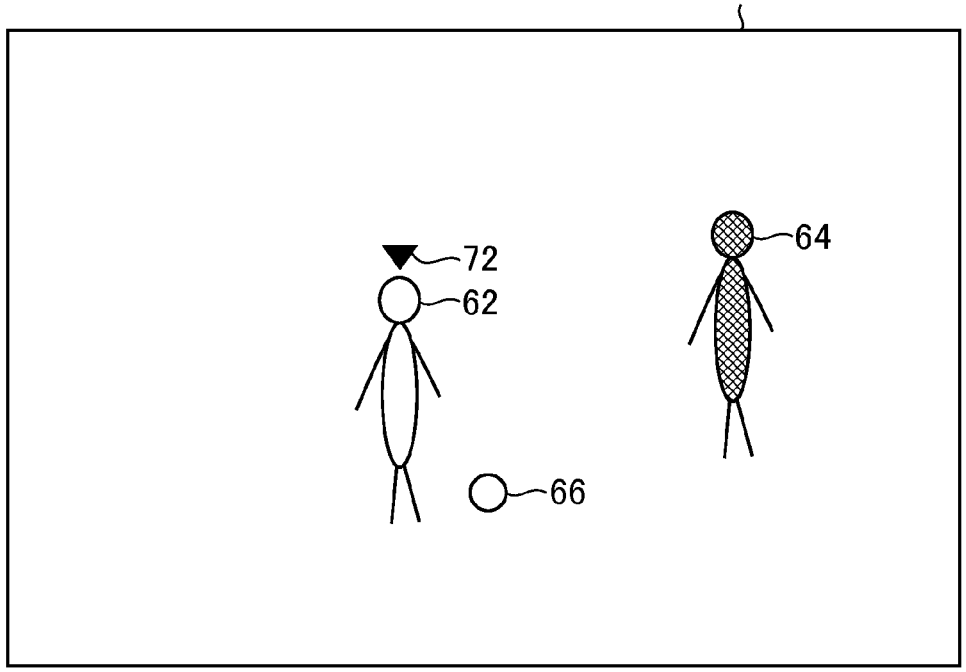
FIG. 3 is a figure illustrating an example of a game screen displayed on a display unit.

FIG. 3 is a figure illustrating an example of the game screen displayed on the display unit 36. As illustrated in FIG. 3, the respective objects included in a visual field of the virtual camera 68 are displayed on a game screen 70. In this embodiment, any one of the characters 62 belonging to the user team performs a behavior based on the user's operation. In a state illustrated in FIG. 3, for example, the character 62 in possession of the ball 66 is set as an operation target of the user. A cursor 72 indicating that the character 62 is set as the operation target of the user is displayed above a head of the character 62.

For example, the user performs a direction instruction operation by using the operation unit 34, to thereby cause the character 62 being the operation target to move in an instructed direction. For example, when the character 62 is in possession of the ball 66, the user uses the operation unit 34 to instruct the character 62 to dribble in a given direction or to kick the ball 66 in a given direction.

The respective characters 62 (64) arranged in the game space 50 that are not set as the operation target of the user autonomously behave in accordance with a predetermined behavior algorithm. For example, the characters 62 (64) other than the operation target of the user behave based on an operation performed by the computer.

In the game system S according to this embodiment, a picture of the game played by the user is stored under given conditions. Then, the stored picture is uploaded onto the SNS server 2. The picture uploaded onto the SNS server 2 can be viewed by the user who uses the game system S. In other words, users other than the user who has uploaded the picture are also allowed to view the picture.

Figure 4:
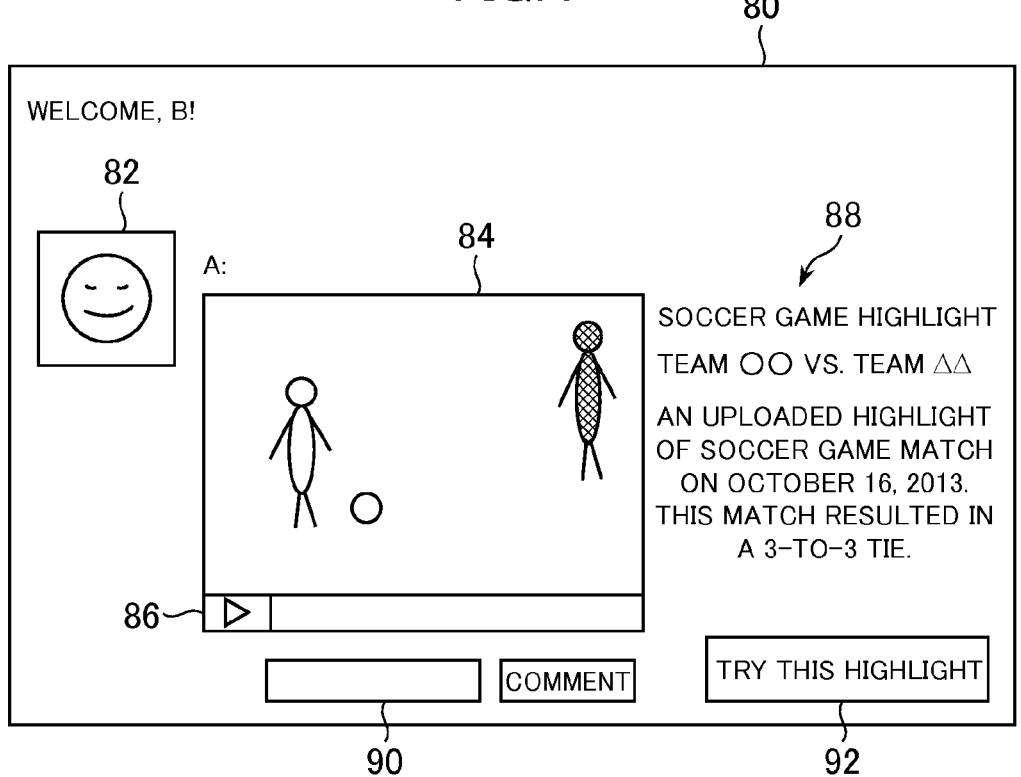
FIG. 4 is a figure illustrating an example of an SNS screen displayed on the display unit.

FIG. 4 is a figure illustrating an example of an SNS screen displayed on the display unit 36. An SNS screen 80 is, for example, a screen that allows one user to communicate to/from another user. As illustrated in FIG. 4, a user image 82 representing a photograph, an avatar image, or the like of another user and a display area 84 for displaying the picture uploaded by the another user are displayed on the SNS screen 80.

When the user selects a playback button 86, the picture obtained when another user played the soccer game (for example, scene in which the another user scored a goal) is played back in the display area 84. Further, picture details information 88 indicating a description of the picture is displayed on the SNS screen 80. The user may be allowed to leave a comment on the picture through an input thereof in a comment input field 90.

Further, a start button 92 is displayed on the SNS screen 80. In this case, a URL of the game server 1 is set in the start button 92. Note that, the URL may be a URL with a parameter, and a parameter relating to the soccer game may be included in a link set in the start button 92. In this case, when the user selects the start button 92, the parameter included in the URL is transmitted to the game server 1.

When the user selects the start button 92, the user can play the soccer game starting from a situation corresponding to the picture displayed in the display area 84. For example, even if the user who selects the start button 92 has not registered for the game, the user can try the soccer game. In this configuration, the user who has viewed the picture can start the game from the situation of the match at a start timing of the picture displayed in the display area 84. This configuration is described below in detail.

3. Functions Implemented by Game System

Figure 5:
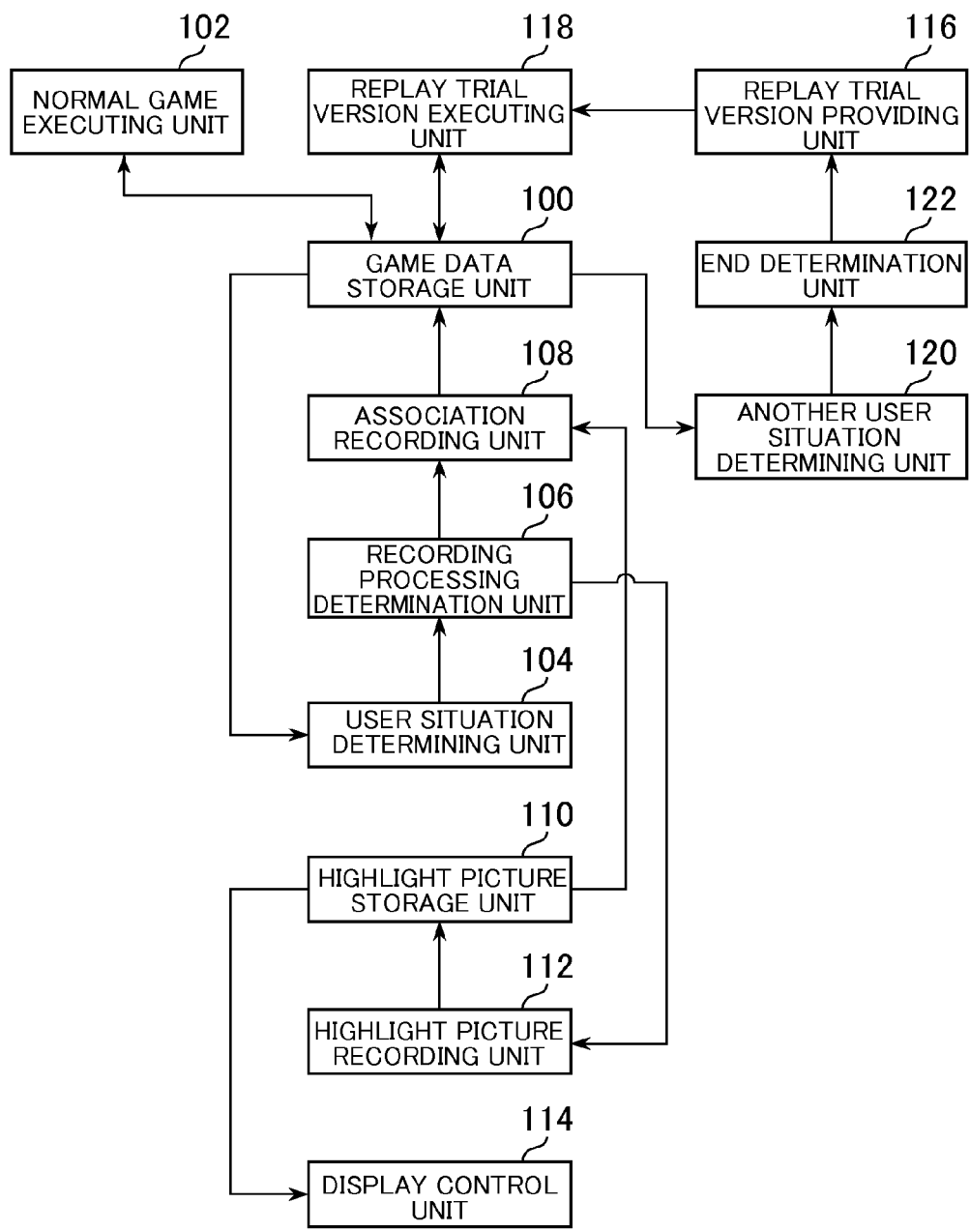
FIG. 5 is a functional block diagram of the game system.

FIG. 5 is a functional block diagram of the game system S. As illustrated in FIG. 5, the game system S includes a game data storage unit 100, a normal game executing unit 102, a user situation determining unit 104, a recording processing determination unit 106, an association recording unit 108, a highlight picture storage unit 110, a highlight picture recording unit 112, a display control unit 114, a replay trial version providing unit 116, a replay trial version executing unit 118, an another user situation determining unit 120, and an end determination unit 122.

This embodiment is described by taking a case where the game server 1 implements the game data storage unit 100, the normal game executing unit 102, the user situation determining unit 104, the recording processing determination unit 106, the association recording unit 108, the replay trial version providing unit 116, the replay trial version executing unit 118, the another user situation determining unit 120, and the end determination unit 122. In the game server 1, those functions are implemented by the control unit 10 operating in accordance with the programs read from the storage unit 12. The game data storage unit 100 is implemented mainly by the storage unit 12, and the other respective functions are implemented mainly by the control unit 10.

Further, this embodiment is described by taking a case where the SNS server 2 implements the highlight picture storage unit 110, the highlight picture recording unit 112, and the display control unit 114. In the SNS server 2, those functions are implemented by the control unit 20 operating in accordance with the programs read from the storage unit 22. The highlight picture storage unit 110 is implemented mainly by the storage unit 22, and the other respective functions are implemented mainly by the control unit 20.

[3-1. Game Data Storage Unit]

The game data storage unit 100 stores various kinds of data relating to the game played by the user. The game data storage unit 100 stores user data relating to each of a plurality of users, game situation data indicating a situation of the game in execution, and picture-situation association data.

The information relating to each user who uses the game system S is stored as the user data. For example, the user data is associated with the user ID for identifying the user and various kinds of information (for example, personal information such as a user name) relating to the user.

The game situation data indicates the current situation of the soccer game. The game situation data includes a current state of the game space 50, for example, includes a state of the object placed in the game space 50 (for example, position and posture of the character 62 (64)), parameters relating to the character 62 (64), a state of a movement subject (such as position and moving direction of the ball 66), a current progress of the match (for example, scores of the teams), and an elapsed time of the match.

FIG. 6 is a data storage example of the picture-situation association data. As illustrated in FIG. 6, an association between the picture of the game played by the user and the situation of the game at a given timing of the picture is stored in the picture-situation association data. The given timing represents, for example, the start timing of the picture or a time point a predetermined time before or after the start timing of the picture. It is assumed here that the picture and the situation of the game at the start timing of the picture are stored in the picture-situation association data in association with each other.

Note that, contents stored in the game data storage unit 100 are not limited to the above-mentioned example. It suffices that various kinds of data necessary to execute the game is stored in the game data storage unit 100. Further, the game situation data on the game in execution does not necessarily match the game situation data stored in the picture-situation association data. Only necessary items of the data included in the game situation data on the game in execution (for example, only locations of the character (64) and the ball 66) may be stored in the picture-situation association data.

[3-2. Normal Game Executing Unit]

The normal game executing unit 102 controls the game played by the user. Note that, a normal game represents, for example, a game starting from an initial state or a state saved by the user instead of the game starting from the situation associated with the picture. The normal game executing unit 102 acquires storage content of the game data storage unit 100. Further, the normal game executing unit 102 executes the game while updating the game situation data. For example, the normal game executing unit 102 progresses the game by executing various kinds of processing described in the game program based on the user's operation, and updates the game situation data.

Further, in this embodiment, the normal game executing unit 102 generates the picture of the game played by the user. The normal game executing unit 102 generates an image expressing how the game space 50 is viewed from a given point of view, and displays the image on the game screen 70. Further, the normal game executing unit 102 records the image expressing how the game space 50 is viewed from the given point of view in time series, to thereby store the picture of the game played by the user (in other words, picture displayed on the game screen 70).

Note that, the processing executed by the normal game executing unit 102 is not limited to the above-mentioned example. The normal game executing unit 102 serves as an agent for executing the various kinds of processing relating to the game. In addition, for example, the normal game executing unit 102 distributes the game situation data and image data on the game screen 70 to the user devices 3.

[3-3. User Situation Determining Unit]

The user situation determining unit 104 determines whether or not the situation of the game played by the user is a given situation. The given situation represents a situation in which the game situation data satisfies a predetermined condition, and is a state in which a value indicating the game situation data falls within a predetermined range. Further, in this specification, the "user" represents a user who has played the game regarding the picture, for example, a user who is to upload the picture.

For example, the user situation determining unit 104 determines whether or not a state of the game space 50 has become a given state, or determines whether or not the character 62 (64) placed in the game space 50 is to perform a given action. Further, for example, the user situation determining unit 104 may determine whether or not a position of the object (for example, ball 66) placed in the game space 50 exists inside a predetermined area, or may determine whether or not a change in the position of the object (for example, ball 66) placed in the game space 50 matches a given change.

In this case, it is determined that the situation of the game played by the user is the given situation, for example, when the score changes in the game, when the character 62 (64) is to perform a predetermined action (for example, when a free kick or a penalty kick is to be performed or when a pass is to be performed after the number of passes during a predetermined period has reached a reference number), when the ball 66 or the character 62 (64) in possession of the ball 66 moves into a predetermined area (for example, area within a predetermined distance from the goal 60), or when a moving distance of the ball 66 or the character 62 (64) in possession of the ball 66 has become equal to or larger than a reference distance.

[3-4. Recording Processing Determination Unit]

The recording processing determination unit 106 determines, based on a determination result from the user situation determining unit 104, whether or not recording processing is to be executed by the association recording unit 108. The recording processing determination unit 106 causes the association recording unit 108 to execute the recording processing when it is determined that the situation of the game played by the user is the given situation, and inhibits the association recording unit 108 from executing the recording processing when it is determined that the situation of the game played by the user is not the given situation.

[3-5. Association Recording Unit]

The association recording unit 108 records the picture of the game played by the user and the situation of the game at the given timing of the picture in storage means (for example, game data storage unit 100) in association with each other. In this case, the association recording unit 108 stores a picture ID for identifying the picture of the game played by the user and the situation of the game at the start timing of the picture in the picture-situation association data in association with each other.

Note that, in this case, the picture ID to be stored in the picture-situation association data is generated by the normal game executing unit 102 when the picture of the game played by the user is stored. Further, the situation of the game at the start timing is acquired by the association recording unit 108 from the game data storage unit 100. The association recording unit 108 stores the generated picture ID and the acquired situation in the picture-situation association data in association with each other.

[3-6. Highlight Picture Storage Unit]

The highlight picture storage unit 110 stores the picture of the game played by the user. The highlight picture storage unit 110 stores, for example, picture data indicating the picture generated by the normal game executing unit 102.

FIG. 7 is a figure illustrating storage content of the highlight picture storage unit 110. As illustrated in FIG. 7, the picture ID for identifying the picture data, the user ID of the user who has performed a gameplay regarding the picture, and the picture data are stored in association with one another. Note that, the storage content of the highlight picture storage unit 110 is not limited to the example illustrated in FIG. 7. In addition, for example, a thumbnail image of the picture displayed on the SNS screen 80 may be generated based on the picture data and stored. Further, the picture may be a moving image or a still image.

[3-7. Highlight Picture Recording Unit]

The highlight picture recording unit 112 records the picture of the game played by the user in the highlight picture storage unit 110. The highlight picture recording unit 112 acquires the picture data indicating the picture generated by the normal game executing unit 102, and records the picture data in the highlight picture storage unit 110. In this case, the highlight picture recording unit 112 records the picture ID generated by the normal game executing unit 102, the user ID acquired from the game data storage unit 100, and the picture data in the highlight picture storage unit 110 in association with one another. For example, the highlight picture recording unit 112 records the picture data in the highlight picture storage unit 110 when the recording processing determination unit 106 determines that the picture is to be recorded.

[3-8. Display Control Unit]

The display control unit 114 displays the picture on display means corresponding to another user (for example, display unit 36 of the user device 3 operated by another user). The wording "another user" as used herein represents a user who plays the game from the situation associated with the picture, for example, a user who has viewed the picture on the SNS screen 80. Further, the "display means corresponding to another user" represents the display unit 36 of the user device 3 that is different from the user device 3 that has uploaded the picture of the game onto the SNS server 2, in other words, the display unit 36 of the user device 3 that is different from the user device 3 used for the gameplay regarding the picture.

The display control unit 114 causes the display unit 36 of the user device 3 to playback the picture data, to thereby display the picture thereon. In this case, the display control unit 114 transmits the picture data stored in the highlight picture storage unit 110 to the user device 3, to thereby display the picture on the display unit 36 of the user device 3.

[3-9. Replay Trial Version Providing Unit]

The replay trial version providing unit 116 provides another user with the game starting from the given timing based on the situation of the game associated with the picture. The replay trial version providing unit 116 provides another user with the game starting from the situation of the game associated with the picture displayed on the user device 3. The wording "provides another user with the game" represents causing another user to play the game and progressing the game in response to the another user's operation.

[3-10. Replay Trial Version Executing Unit]

The replay trial version executing unit 118 executes the game starting from the given timing based on another user's operation. The replay trial version executing unit 118 progresses the game starting from the given timing by updating the game situation data associated with the picture based on the another user's operation.

[3-11. Another User Situation Determining Unit]

The another user situation determining unit 120 determines, when another user plays the game provided by the replay trial version providing unit 116, whether or not the situation of the game is a given situation. The another user situation determining unit 120 determines whether or not the situation of the game provided to another user has become an ending situation for bringing the game to an end.

For example, the another user situation determining unit 120 determines whether or not the state of the game space 50 has become a given state, or determines whether or not the character 62 (64) placed in the game space 50 has performed a given action. Further, for example, the another user situation determining unit 120 may determine whether or not the position of the object (for example, ball 66) placed in the game space 50 exists inside a predetermined area, or may determine whether or not a change in the position of the object (for example, ball 66) placed in the game space 50 matches a given change.

In this case, the another user situation determining unit 120 determines, when another user plays the game provided by the replay trial version providing unit 116, whether or not the elapsed time since the game is started reaches a reference time. When determining that the elapsed time has reached the reference time, the another user situation determining unit 120 determines that the situation of the game provided to the another user has become the ending situation for bringing the game to an end.

[3-12. End Determination Unit]

The end determination unit 122 determines whether or not to bring the game provided by the replay trial version providing unit 116 to an end based on a determination result from the another user situation determining unit 120. The wording "bring the game to an end" as used herein represents canceling the provision of the game made by the replay trial version providing unit 116 and inhibiting the game from progressing in response to another user's operation.

The end determination unit 122 determines, when it is determined that the situation of the game is a given ending situation, that the game provided by the replay trial version providing unit 116 is to be brought to an end, and when it is not determined that the situation of the game is the given ending situation, that the game provided by the replay trial version providing unit 116 is to be continued without being brought to an end. In this embodiment, the end determination unit 122 determines, when it is determined that the elapsed time has reached the reference time, that the game provided by the replay trial version providing unit 116 is to be brought to an end.

4. Processing Executed in Game System

Next, a description is made of an example of processing executed in the game system S. The description is made below of picture accumulation processing for accumulating the picture of the game played by the user and game providing processing for providing the user who has viewed the picture with the game starting from the start timing of the picture. Each of the picture accumulation processing and the game providing processing is executed by the control unit 10 operating in accordance with the program read from the storage unit 12, the control unit 20 operating in accordance with the program read from the storage unit 22, and the control unit 30 operating in accordance with the program read from the storage unit 32.

[4-1. Picture Accumulation Processing]

Figure 8:
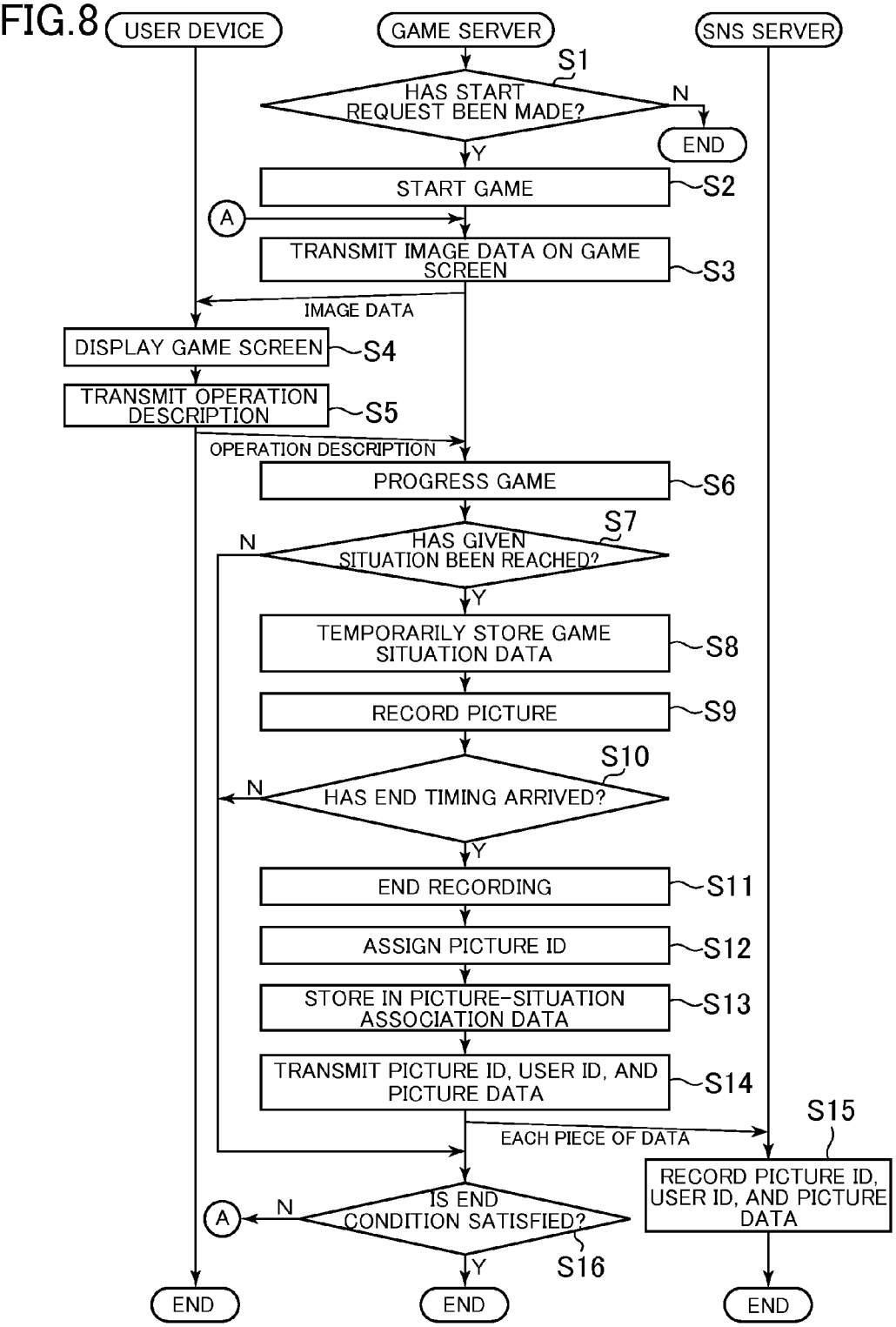
FIG. 8 is a flowchart illustrating an example of picture accumulation processing.

FIG. 8 is a flowchart illustrating an example of the picture accumulation processing. As illustrated in FIG. 8, first, in the game server 1, the control unit 10 determines whether or not a start request for the game has been made by the user based on a signal received from the user device 3 (S1). In Step S1, the control unit 10 determines whether or not a given signal indicating that the user has performed a given operation for starting the game has been received from the user device 3.

Note that, in a case where the game server 1 or the SNS server 2 acquires information from the user device 3, the user ID and the IP address are transmitted from the user device 3. The game server 1 or the SNS server 2 identifies which user of which user device 3 has access thereto by receiving the user ID and the IP address.

When it is determined that the start request for the game has been made (Y in S1), the control unit 10 starts the game to be played by the user who has made the start request (S2). In Step S2, the control unit 10 constructs the game space 50 in the storage unit 12, generates the game situation data, and stores the user ID of the user who has made the start request for the game and the generated game situation data in the storage unit 12 in association with each other. With this configuration, even when a plurality of users simultaneously play the game, the game server 1 can manage the game situation data on the respective users.

The control unit 10 generates the image data on the game screen 70 based on the game situation data stored in the storage unit 12, and transmits the image data to the user device 3 (S3).

On the other hand, in the user device 3, when receiving the image data, the control unit 30 displays the game screen 70 on the display unit 36 (S4). Note that, in execution of this processing, it is assumed that, in the user device 3, the program stored in the storage unit 32 has been activated with the game prepared to start.

The control unit 30 transmits the description of the user's operation to the game server 1 (S5). In Step S5, based on the signal detected by the operation unit 34, the control unit 30 transmits a signal indicating the operation state of the operation unit 34 to the game server 1 via the communication unit 40.

In the game server 1, the control unit 10 progresses the game based on an operation description received from the user device 3 (S6). In Step S6, the control unit 10 updates the game situation data based on the description of the user's operation. Note that, in this processing example, the description is made by taking a case where the image data on the game screen 70 is distributed (or streamed) to the user devices 3 at predetermined time intervals in Step S3, but the game situation data updated in Step S6 may be distributed to the user devices 3. In this case, in the user device 3, the display control of the game screen 70 is executed based on the game situation data received from the game server 1.

The control unit 10 determines whether or not the situation of the game in execution has become the given situation (S7). In Step S7, the control unit 10 determines whether or not the value of the game situation data falls within a predetermined range. For example, the control unit 10 determines whether or not a distance between the goal 60 and the ball 66 has become equal to or smaller than the reference distance. Note that, when storing of the picture is being executed at the current time point in processing of Step S9 described later, the procedure advances to Step S8 without executing the processing of Step S7.

When it is determined that the situation of the game in execution has become the given situation (Y in S7), the control unit 10 temporarily stores the current game situation data in the storage unit 12 (S8).

The control unit 10 records the picture of the game played by the user (S9). In Step S9, the control unit 10 records the picture of the game by recording the image data on the game screen 70 in time series in the storage unit 12. In Step S3, a game screen is distributed from the game server 1 to the user devices 3 at given time intervals, and hence, in Step S9, the control unit 10 stores the image data distributed to the user devices 3 in time series in the storage unit 12 as it is.

The control unit 10 determines whether or not a given end timing has arrived (S10). As the end timing, any timing that is defined in advance may be used. For example, the control unit 10 determines whether or not a predetermined time has elapsed since the storing of the picture is started or whether or not the situation of the game in execution has become a predetermined situation for bringing the storing to an end.

When it is determined that the end timing has arrived (Y in S10), the control unit 10 brings recording of the picture to an end (S11). In Step S11, the control unit 10 generates the picture data in which the game screen 70 output after the start of the recording of the picture until the end thereof is stored in time series, and temporarily stores the picture data in the storage unit 12.

The control unit 10 assigns the picture ID to the picture data recorded in the storage unit 12 (S12). The control unit 10 stores the picture ID generated in Step S12 and the game situation data stored in Step S8 in the picture-situation association data in association with each other (S13). The control unit 10 transmits the picture ID, the user ID of the user who has played the game, and the picture data to the SNS server 2 via the communication unit (S14).

In the SNS server 2, when receiving the picture data from the game server 1, the control unit 20 records the picture ID, the user ID, and the picture data in the storage unit 22 in association with one another (S15).

In the game server 1, the control unit 10 determines whether or not an end condition for the game is satisfied (S16). As the end condition, any given condition for bringing the game to an end may be used. For example, the control unit 10 determines whether or not the user has performed an operation for bringing the game to an end or whether or not a given end time has arrived during the game in execution.

When it is determined that the end condition for the game is satisfied (Y in S16), the procedure is brought to an end. When it is not determined that the end condition for the game is satisfied (N in S16), the procedure returns to Step S3 to continue the game.

By executing the picture accumulation processing in the above-mentioned manner, the picture of the game played by the user and the game situation data at the start timing of the picture are recorded in the storage unit 12 in association with each other.

[4-2. Game Providing Processing]

Figure 9:
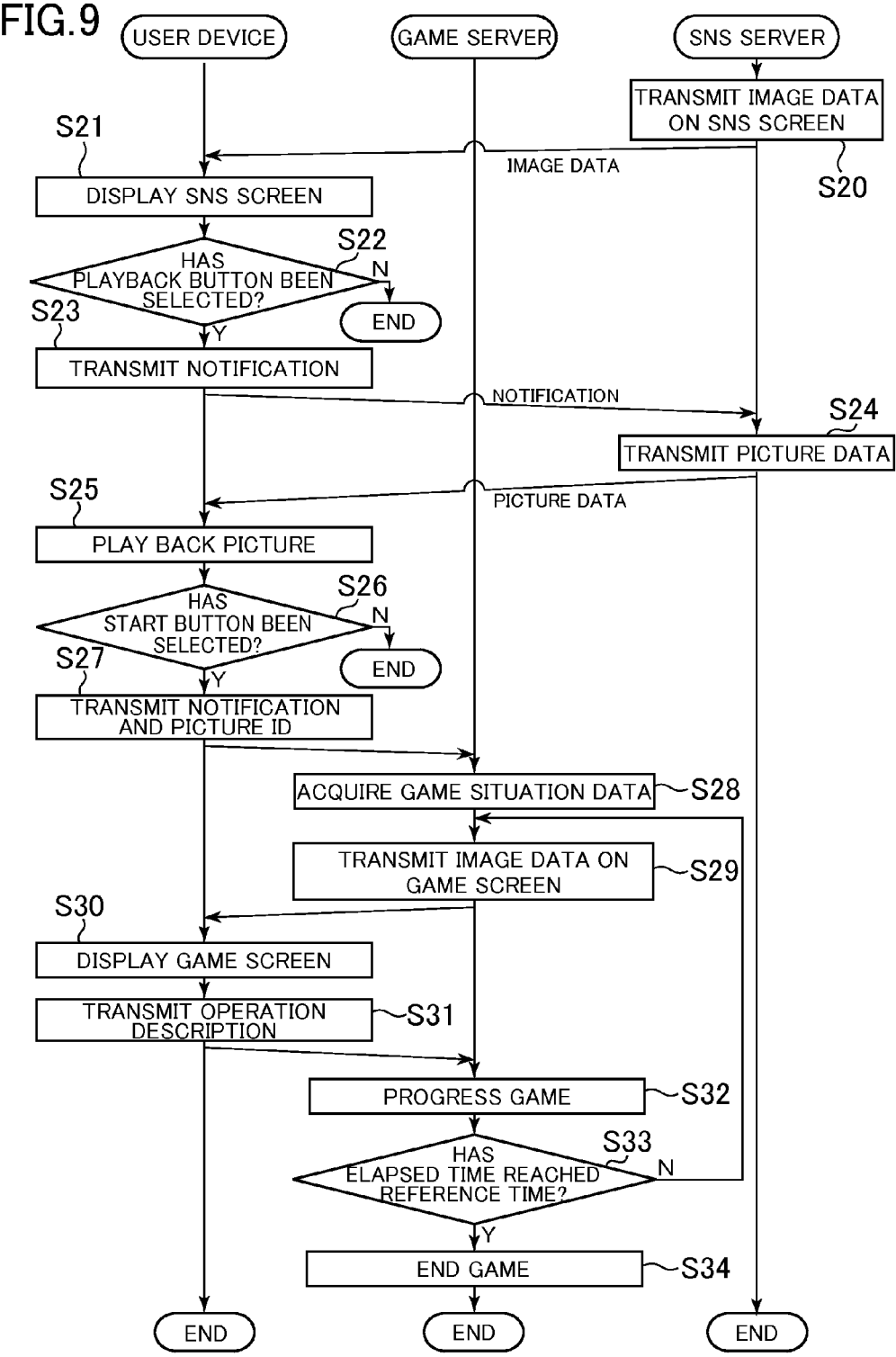
FIG. 9 is a flowchart illustrating an example of game providing processing.

FIG. 9 is a flowchart illustrating an example of the game providing processing. As illustrated in FIG. 9, first, in the SNS server 2, the control unit 20 generates the image data on the SNS screen 80, and transmits the image data to the user device 3 (S20). In Step S20, the control unit 20 generates display data on the SNS screen 80 based on storage content of the storage unit 22.

In the user device 3, when receiving the image data on the SNS screen 80, the control unit 30 displays the SNS screen 80 on the display unit 36 (S21). Note that, it is assumed here that the picture ID of the picture displayed in the display area 84 has been transmitted as well from the SNS server 2 to the user device 3. Further, here, the SNS screen 80 is displayed on a web browser that has been activated on the user device 3. In other words, the control unit 30 displays the SNS screen 80 on the display unit 36 based on HTML data received from the game server 1.

The control unit 30 determines whether or not the playback button 86 has been selected (S22). When it is determined that the playback button 86 has been selected (Y in S22), the control unit 30 transmits a notification that the playback button 86 has been selected to the SNS server 2 via the communication unit 40 (S23).

In the SNS server 2, when receiving the notification that the playback button 86 has been selected, the control unit 20 transmits the picture data stored in the storage unit 22 to the user device 3 (S24).

In the user device 3, when receiving the picture data, the control unit 20 plays back the picture in the display area 84 (S25). The control unit 20 determines whether or not the start button 92 has been selected (S26). When it is determined that the start button 92 has been selected (Y in S26), the control unit 20 transmits the notification that the start button 92 has been selected and the picture ID to the game server 1 via the communication unit 40 (S27).

In the game server 1, when receiving the notification that the start button 92 has been selected and the picture ID, the control unit 10 refers to the picture-situation association data to acquire the game situation data associated with the picture ID (S28).

After that, the control unit 10 starts the game based on the game situation data acquired in Step S28. Steps S29 to S32 are the same as Steps S3 to S6, respectively, and hence the description thereof is omitted. However, in Steps S29 to S32, unlike Steps S3 to S6, the game is started from the situation associated with the picture played back on the SNS screen 80.

The control unit 10 determines whether or not the elapsed time since the game is started has reached the reference time (S33). Note that, it is assumed that the elapsed time since the game is started is appropriately updated while the processing of Steps S29 to S32 is executed.

When it is determined that the elapsed time has reached the reference time (Y in S33), the control unit 10 brings the game to an end (S34). When it is not determined that the elapsed time has reached the reference time (N in S34), the procedure returns to Step S29 to continue the game.

According to the game system S described above, it is possible to cause another user to play the game based on the situation indicated by the picture of a game played by a given user. Further, when the situation of the game played by the given user becomes the given situation, the picture of the game and the situation are recorded in association with each other, which enables another user who has viewed the picture to play the situation.

Further, in a case where the user plays the game from a game situation associated with the picture, the game can be brought to an end when the game being played becomes the given situation. For example, a limitation can be imposed on playing of the game by allowing the game to be played for only a predetermined time.

5. Modified Examples

Note that, the present invention is not limited to the embodiment described above, and may be subjected to various modifications without departing from the gist of the present invention.

Figure 10:
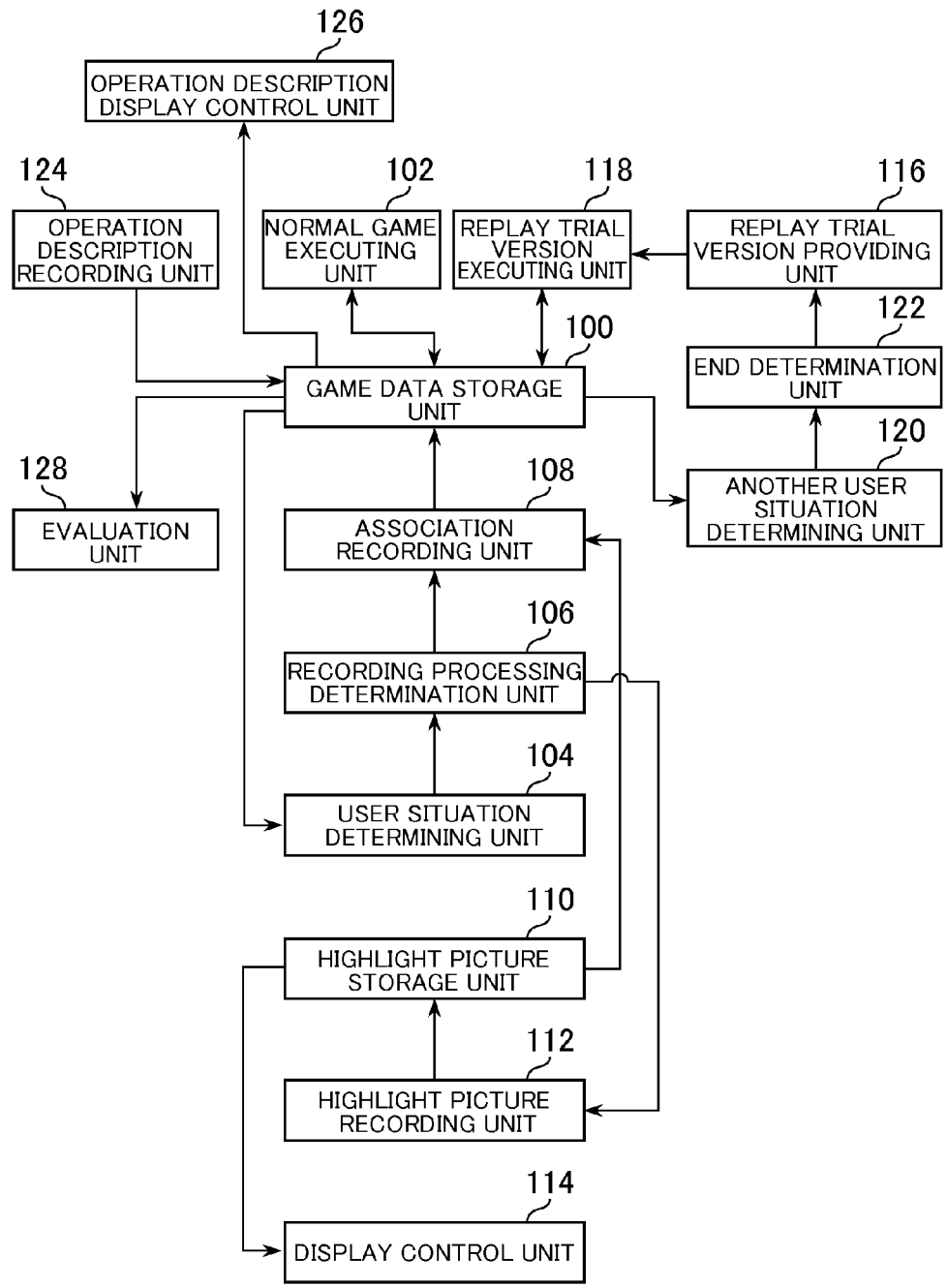
FIG. 10 is a functional block diagram of first to fourth modified examples.

FIG. 10 is a functional block diagram of first to fourth modified examples. As illustrated in FIG. 10, in addition to the functions according to the embodiment, the game system S according to each of the first to fourth modified examples includes an operation description recording unit 124, an operation description display control unit 126, and an evaluation unit 128. A description is now made of a case where those respective functions are implemented by the game server 1. The operation description recording unit 124, the operation description display control unit 126, and the evaluation unit 128 are implemented mainly by the control unit 10.

(1) For example, the description of the user's operation performed in a case where the game regarding the picture is played may be accumulated on the game server 1, and the operation description may be presented as an example to the user who is to play the game from the situation associated with the picture.

The game system S according to the first modified example includes the operation description recording unit 124. The operation description recording unit 124 records the description of the user's operation corresponding to the picture in the storage means (for example, game data storage unit 100). For example, the operation description recording unit 124 acquires the signal detected by the operation unit 34, to thereby store the description of the user's operation in operation description data in time series.

FIG. 11 is a data storage example of the operation description data. As illustrated in FIG. 11, an operation timing at which the user performs an operation and the operation description are stored in the operation description data in association with each other. For example, the operation description recording unit 124 stores the description of the user's operation acquired in Step S6 in the operation description data in association with the elapsed time since the start timing.

The operation description display control unit 126 displays the description of the user's operation corresponding to the picture in the display means corresponding to another user when the another user is to play the game provided by the replay trial version providing unit 116. In this case, the operation description display control unit 126 compares the current time point of the game played by the another user with the operation timing stored in the operation description data, and based on a comparison result thereof, displays the operation description stored in the operation description data.

For example, when the current time point is included in a guide subject period, the operation description display control unit 126 displays an image indicating the description of the user's operation on the game screen 70. The guide subject period represents a period set based on the operation timing stored in the operation description data, and is a predetermined period including the operation timing. For example, the guide subject period is a period after a first time before the operation timing until a second time after the operation timing. It is assumed that the image indicating the operation description is stored in advance in the game data storage unit 100.

According to the first modified example, the description of an operation of the user who has performed the gameplay regarding the picture can be presented to another user.

(2) Further, for example, the description of the user's operation stored in the operation description data may be compared with a description of an operation of another user who plays the game while viewing the picture, to thereby evaluate the gameplay of the another user.

In a case where another user plays the game provided by the replay trial version providing unit 116, the evaluation unit 128 evaluates the gameplay of another user based on the comparison result between the description of the user's operation corresponding to the picture and the description of the another user's operation. The wording "evaluates the gameplay" represents determining whether or not the operation performed by another user is satisfactory, and when the gameplay is evaluated, for example, parameters regarding another user are changed, or given display control processing is executed on the game screen 70.

For example, the evaluation unit 128 evaluates the gameplay of the another user based on a matching degree between the description of the user's operation and the description of the another user's operation. In this case, the evaluation unit 128 evaluates the gameplay of the another user based on whether or not the description of the user's operation matches the description of the another user's operation and whether or not a time lag between a timing of the user's operation and a timing of the another user's operation falls within a reference range.

In a case where there is a match between the description of the user's operation and the description of the another user's operation, the evaluation unit 128 gives more excellent evaluation to the another user than in a case where there is no match therebetween. Further, the evaluation unit 128 gives more excellent evaluation to the another user as the time lag between the timing of the user's operation and the timing of the another user's operation becomes smaller.

According to the second modified example, it is possible to evaluate the gameplay of another user by comparing the description of the operation of the user who has performed the gameplay regarding the picture with the description of the operation of the another user who performs the gameplay while viewing the picture.

(3) Further, for example, while the picture is being played back on the SNS screen 80, the game server 1 may construct the game space 50 based on the situation associated with the picture to make a preparation to start the game while another user is viewing the picture.

The replay trial version providing unit 116 according to the third modified example makes a preparation to start the game to be provided to another user while the picture is being played back on the display means corresponding to another user (for example, display unit 36 of the user device 3 operated by another user). The wording "makes a preparation to start the game" represents executing loading of (read processing for) data necessary to start the game, and here refers to processing for reading the game situation data associated with the picture to construct the game space 50.

For example, when receiving the notification that the playback button 86 has been selected from the user device 3, the SNS server 2 transmits a notification that the game server 1 is to make a preparation to start the game and the picture ID of the picture to be played back to the game server 1. In the game server 1, when receiving the notification that the game server 1 is to make a preparation to start the game and the picture ID of the picture to be played back, the control unit 10 reads the game situation data associated with the picture ID from the storage unit 12 and constructs the game space 50.

According to the third modified example, the game server 1 makes a preparation to start the game while the picture is being played back on the SNS screen 80, and hence it is possible to start the game smoothly when another user selects the start button 92.

(4) Further, for example, the description is made above by taking the case where the game situation data at the start timing of the picture is recorded, but the game situation data obtained a predetermined time before or after the start timing of the picture may be stored to cause another user to play the game from the above-mentioned situation. In addition, for example, the game situation data obtained after the start timing of the picture until the end timing thereof may be recorded in time series.

Further, for example, the description is made above by taking the case where another user who has viewed a highlight picture is provided with a trial version of the game, but the game provided to the another user is not limited to the trial version of the game. In other words, the another user may have already completed registration for use of the soccer game. Further, the picture displayed on the SNS screen 80 is not limited to the picture showing a highlight. It suffices that the picture of the game played by the user is displayed on the SNS screen 80.

Further, for example, the data and the program described above as being stored in the storage unit 12 may be supplied to the game server 1 via an external storage medium, or may be supplied to the game server 1 from another device via the network.

Further, for example, at least two of the embodiment and the modified examples described above may be combined.

Further, the description of the embodiment is made above by taking the example in which the respective functions illustrated in the functional block diagrams are implemented by the game server 1 or the SNS server 2. Each of the above-mentioned functions included in the game system S may be included in any one of the game server 1, the SNS server 2, and the user device 3. In other words, the respective functions illustrated in the functional block diagrams may be shared among the game server 1, the SNS server 2, and the user device 3. Each of the devices included in the game system S implements each of the above-mentioned functions appropriately by transmitting/receiving the data via the network or the like.

For example, the game data storage unit 100, the normal game executing unit 102, the replay trial version providing unit 116, and the replay trial version executing unit 118 may be implemented by the SNS server 2. In other words, the processing relating to the soccer game played by another user may be executed on the SNS server 2 instead of the game server 1.

For example, the game data storage unit 100, the normal game executing unit 102, the replay trial version providing unit 116, and the replay trial version executing unit 118 may be implemented by the user device 3. In other words, the processing relating to the soccer game played by each user may be executed on the user device 3 of each user instead of the game server 1. In this case, the picture-situation association data is stored in the storage unit 12 of the game server 1, and the control unit 10 acquires storage content of the storage unit 12. Then, the control unit 10 transmits the game situation data to the user device 3.

Further, the description of the embodiment is made above by taking the example in which the game system S includes the game server 1, the SNS server 2, and the plurality of user devices 3, but the game server 1 and the SNS server 2 may be combined into one server. Further, a place where the picture of the game played by the user is made public to other users is not limited to an SNS. The picture may be recorded in the game server 1 without existence of the SNS server 2. In addition, for example, a moving image sharing server for sharing pictures uploaded by users may be used. Further, the game server 1 may include a plurality of servers.

Further, the description is made above by assuming the soccer game as the game executed in the game system S, but any game that can record the picture of the game screen may be used as the game executed in the game system S. Examples thereof may include an American football game, a basketball game, and a hockey game. Further, a game other than the sports games may be used, and examples thereof may include a first person shooting (FPS) game, a role-playing game, an action game, and a puzzle game.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game system for controlling a game, the game system comprising:
   recording means for recording a picture of the game that has been played by a first user who has registered for use of the game and a situation of the game at a given timing of the picture in storage means in association with each other;
   means for sending the picture included in a message to a second user who has not registered for use of the game for display on a display of the second user, in order to alert the second user about the game and invite the second user to play the game online;
   providing means for providing the second user with the game starting from the given timing based on the situation of the game associated with the picture after the picture in the message is displayed, even though the second user has not registered for use of the game;
   second user situation determining means for determining, in a case where the second user plays the game provided by the providing means, whether or not the situation of the game is a given situation;
   end determination means for determining whether or not to bring the game provided by the providing means to an end based on a determination result from the second user situation determining means;
   means for determining whether or not the situation of the game played by the first user is a first situation; and
   means for determining that the game played by the first user is to be brought to an end in a case where it is determined that the situation of the game is the first situation,
   wherein:
   the second user situation determining means determines, in the case where the second user plays the game provided by the providing means, whether or not the situation of the game is a second situation that is different from the first situation, and
   the end determination means determines that the game provided by the providing means is to be brought to an end in a case where it is determined that the situation of the game is the second situation.

2. The game system according to claim 1, further comprising:
   user situation determining means for determining whether or not the situation of the game played by the first user is a given situation; and
   means for determining, based on a determination result from the first user situation determining means, whether or not recording processing is to be executed by the recording means.

3. The game system according to claim 1, wherein:
   the second user situation determining means determines, in the case where the second user plays the game provided by the providing means, whether or not an elapsed time since the game is started reaches a reference time; and
   the end determination means determines that the game provided by the providing means is to be brought to an end in a case where it is determined that the elapsed time has reached the reference time.

4. The game system according to claim 1, further comprising:
   means for recording a description of an operation of the first user corresponding to the picture in the storage means; and
   means for displaying, in a case where the second user plays the game provided by the providing means, the description of the operation of the first user corresponding to the picture in the display means corresponding to the second user.

5. The game system according to claim 1, further comprising:
   means for recording a description of an operation of the first user corresponding to the picture in the storage means; and
   means for evaluating, in a case where the second user plays the game provided by the providing means, a gameplay of the second user based on a comparison result between the description of the operation of the first user corresponding to the picture and a description of an operation of the second user.

6. The game system according to claim 1, wherein the providing means makes a preparation to start the game to be provided to the second user during a period in which the picture is being played back on the display means corresponding to the second user.

7. The game system according to claim 1, wherein the second situation is easier than the first situation in the game provided by the providing means.

8. The game system according to claim 1, wherein:
   the second user situation determining means determines, in the case where the second user plays the game provided by the providing means, whether or not a state of a game space becomes a given state; and
   the end determination means determines that the game provided by the providing means is to be brought to an end in a case where it is determined that the state of the game space has become the given state.

9. The game system according to claim 1, wherein:
   the second user situation determining means determines, in the case where the second user plays the game provided by the providing means, whether or not a character placed in a game space performs a given action; and
   the end determination means determines that the game provided by the providing means is to be brought to an end in a case where it is determined that the character has performed the given action.

10. The game system according to claim 1, wherein:
    the second user situation determining means determines, in the case where the second user plays the game provided by the providing means, whether or not a position of a object placed in a game space exists inside a predetermined area; and
    the end determination means determines that the game provided by the providing means is to be brought to an end in a case where it is determined that the position of the object has existed inside the predetermined area.

11. The game system according to claim 1, wherein:
    the second user situation determining means determines, in the case where the second user plays the game provided by the providing means, whether or not a change in a position of a object placed in a game space matches a given change; and the end determination means determines that the game provided by the providing means is to be brought to an end in a case where it is determined that the change in the position has matched the given change.

12. The game system according to claim 1, wherein the message is sent via a social networking service (SNS).

13. A game control method for a game, the game control method comprising:

acquiring, by at least one central processing unit (CPU), storage content of a storage for storing a picture of the game that has been played by a first user who has registered for use of the game and a situation of the game at a given timing of the picture in association with each other;

sending a message including the picture to a second user who has not registered for the use of the game for display on a display of the second user, in order to alert the second user about the game and invite the second user to play the game online;

providing, by at least one central processing unit (CPU), the second user with the game starting from the given timing based on the situation of the game associated with the picture after the picture in the message is displayed on a display corresponding to the another user, even though the second user has not registered for use of the game;

determining, by at least one central processing unit (CPU) in a determination in a case where the second user plays the provided game, whether or not the situation of the game is a given situation; and bringing, by at least one central processing unit (CPU), the provided game to an end based on the determination, wherein determining in the determination comprises:
determining whether or not the situation of the game played by the first user is a first situation; and
determining that the game played by the first user is to be brought to an end in a case where it is determined that the situation of the game is the first situation, wherein:
the determination further comprises, in the case where the second user plays the provided game, determining whether or not the situation of the game is a second situation that is different from the first situation, and
bringing the provided game to an end comprises determining that the game provided by the providing means is to be brought to an end in a case where it is determined that the situation of the game is the second situation.

14. A non-transitory computer-readable information storage medium having recorded thereon a program for causing a computer to perform a function of:

acquiring storage content from a storage for storing a picture of a game that has been played by a first user who has registered for use of the game and a situation of the game at a given timing of the picture in association with each other;

sending a message including the picture to a second user who has not registered for the use of the game for display on a display of the second user, in order to alert the second user about the game and invite the second user to play the game online;

providing the second user with the game starting from the given timing based on the situation of the game associated with the picture after the picture in the message is displayed, even though the second user has not registered for use of the game;

determining, in a case where the second user plays the provided game, whether or not the situation of the game is a given situation; and bringing the provided game to an end based on the determination, wherein determining in the determination comprises:
determining whether or not the situation of the game played by the first user is a first situation; and
determining that the game played by the first user is to be brought to an end in a case where it is determined that the situation of the game is the first situation, wherein:
the determination further comprises, in the case where the second user plays the provided game, determining whether or not the situation of the game is a second situation that is different from the first situation, and
bringing the provided game to an end comprises determining that the game provided by the providing means is to be brought to an end in a case where it is determined that the situation of the game is the second situation.

15. A game system for controlling a game, the game system comprising at least one central processing unit (CPU) configured to:

record a picture of the game that has been played by a first user who has registered for use of the game and a situation of the game at a given timing of the picture in a storage in association with each other;

send a message including the picture to a second user who has not registered for the use of the game for display on a display of the second user, in order to alert the second user about the game and invite the second user to play the game online;

provide the second user with the game starting from the given timing based on the situation of the game associated with the picture after the picture in the message is displayed, even though the second user has not registered for use of the game;

determine, in a second user determination in a case where the second user plays the provided game, whether or not the situation of the game is a given situation;

determine whether or not to bring the provided game to an end based on the second user determination;

determine, in a first user determination, whether or not the situation of the game played by the first user is a first situation; and determine that the game played by the first user is to be brought to an end in a case where it is determined that the situation of the game is the first situation, wherein:
the given situation is a second situation that is different from the first situation, and
the provided game is determined to be brought to an end in a case where it is determined that the situation of the game is the second situation.

* * * * *